Patented July 28, 1953

2,647,158

UNITED STATES PATENT OFFICE 2,647,158

METHOD OF MAKING ACID RESISTING MICROPOROUS MATERIAL FOR STORAGE BATTERY SEPARATORS

Frank Booth, Denton, near Manchester, England

No Drawing. Application August 17, 1948, Serial No. 44,807. In Great Britain April 18, 1947

8 Claims. (Cl. 136—148)

This invention relates to the manufacture of an acid-resisting, micro-porous material and the object of the invention is to provide a material which will be suitable for use for example as a separator for storage batteries instead of the natural wood separators at present commonly used and which will be more resistant to chemical action and less liable to shrink or crack on drying.

According to the invention, a micro-porous material is made from wood pulp by mixing the wood pulp in a wet condition with a water-soluble polymerisable synthetic resin in a proportion of not more than approximately 5 parts by volume of synthetic resin to 150 parts by volume of wood pulp, drying the mixture and heat treating it to polymerise the resin. Before being dried, the mixture may be felted or formed into a sheet by a process similar to that used for paper making. The invention includes a product consisting of a micro-porous body composed of wood fibres bonded together by means of a water-soluble polymerisable synthetic resin, when produced by a method of manufacture according to the present invention.

The nature of the invention and the subsidiary features thereof will be understood from the following more detailed description of a process according to the invention for making separators for storage batteries from balsa wood of a weight between four and ten pounds per cubic foot or other soft light wood such as Quipo, Obiche or the like.

The balsa wood is first shredded and then digested with an alkali to soften and loosen the fibres of the wood and to remove substances that would be deleterious to the plates of a storage battery. A digestion for a period of forty-eight hours approximately at boiling point with a four per cent solution of caustic soda has been found suitable.

The digested shredded material is subsequently treated to convert it into a fine pulp. This process appears to be facilitated by the addition of silica gel to the shredded material before the fine pulping. For example, 600 cc. of silica gel may be mixed with 3 gallons of the digested shredded material. The pulping may be effected by means of an edge runner mill or a hammer pulverising machine or in a beating machine as used in paper manufacture.

An aqueous suspension of finely pulped material is thus produced and this is mixed with a wetting or dispersing agent to keep the fibres in suspension and with a proportion of water-soluble phenolformaldehyde resin, or other water-soluble synthetic resin, capable of being polymerised to form an acid-resisting polymer. For example, 150 parts by volume of the wet pulp mixture containing the silica gel hereinbefore referred to may be mixed with 3 parts of dispersing agent, and 3 parts of synthetic resin.

The wet mixture containing the dispersing agent and resin is filtered under suction so as to form it into a cake or sheet by a process similar to that used in paper making and is then dried. Deformation and shrinkage during the drying process may be prevented by drying the cake under pressure at a temperature of from 90° to 95° C. The dried cake is then heat treated to polymerise the resin to form an acid resisting polymer which will bond the wood fibres. The dried board so obtained may be cut and grooved in the same way as the natural wood used for making separators for storage batteries. Alternatively, the material may be moulded to the form required during the process of polymerising the resin by heat and pressure.

The formation of the cake from the wet pulp mixture and the subsequent drying and heat treatment may be carried out with machinery similar to that used for paper making and arranged to produce continuous strips of material which can be cut into lengths as required, and a separator readily produced in which the pores are under three microns in size.

I claim:

1. Method of manufacturing micro-porous material for use in constructing separators for a storage battery, comprising the steps of treating shredded balsa wood with an alkali to soften and loosen the fibres thereof and to remove substances that would be deleterious to the plates of a storage battery incorporating silica gel in the material thus treated in the ratio of 600 cc. of gel to three gallons of treated material, converting the treated material into a fine pulp, mixing the aqueous suspension thus obtained with a dispersing agent in the proportion of 150 parts by volume of the suspension with 3 parts of the dispersing agent and with 3 parts of a water-soluble phenol formaldehyde resin, filtering the mixture under suction to form a solid dry mass, and polymerising the dry mass.

2. Method of manufacturing micro-porous material according to claim 1, which comprises the additional step of drying the mixture whilst the material is under pressure and at a temperature of from 90° to 95° C.

3. Method of manufacturing micro-porous material for use in constructing separators for a storage battery, which comprises the steps of treating a shredded wood with an alkali to soften and loosen the fibres thereof and to remove substances that would be deleterious to the plates of a storage battery, converting the shredded wood into a fine pulp, mixing the wood pulp in the wet condition with a water-soluble synthetic resin capable of being polymerised to form an acid-resisting polymer, said water-soluble synthetic resin being included in a proportion not exceeding 5 parts by volume of synthetic resin to 150 parts by volume of wood pulp, drying the mixture to form a solid dry mass, and thereafter heat treating it to polymerise the resin.

4. Method of manufacturing micro-porous material for use in constructing separators for a storage battery, which comprises the steps of treating a shredded wood with an alkali to soften and loosen the fibres thereof and to remove substances that would be deleterious to the plates of a storage battery, incorporating silica gel in the material thus treated, converting the shredded material into a fine pulp, mixing the resultant aqueous suspension of finely pulped material with a dispersing agent and a water-soluble synthetic resin capable of being polymerised to form an acid-resisting polymer, said water-soluble synthetic resin being included in a proportion not exceeding 5 parts by volume of synthetic resin to 150 parts by volume of wood pulp, forming a solid dry mass from the wet mixture produced, and polymerising the synthetic resin to form an acid-resisting polymer in the dry mass.

5. Method of manufacturing micro-porous material for use in constructing separators for a storage battery, which comprises the steps of treating a shredded wood with an alkali to soften and loosen the fibres thereof and to remove substances that would be deleterious to the plates of a storage battery, incorporating silica gel in the material thus treated, converting the shredded material into a fine pulp, mixing the resultant aqueous suspension of finely pulped material with a dispersing agent and a water-soluble synthetic resin capable of being polymerised to form an acid-resisting polymer, said water-soluble synthetic resin being included in a proportion not exceeding 5 parts by volume of synthetic resin to 150 parts by volume of wood pulp, forming a solid dry mass from the wet mixture produced, and polymerising the synthetic resin to form an acid-resisting polymer in the dry mass by a moulding operation in which the separator is formed.

6. Method of manufacturing micro-porous material for use in constructing separators for a storage battery, which comprises the steps of treating a shredded light-weight wood, such as balsa wood, for a period of approximately forty-eight hours with a four per cent solution of caustic soda to soften and loosen the fibres thereof and to remove substances that would be deleterious to the plates of a storage battery, converting the shredded material thus treated into a fine pulp, mixing the wood pulp in wet condition with a water-soluble phenol-formaldehyde resin in a proportion of not more than 5 parts by volume of phenol-formaldehyde to 150 parts by volume of wet pulp, forming a solid dry mass from the wet mixture produced, and polymerising the phenol-formaledhyde resin to form an acid-resisting polymer in the dry mass.

7. Method of manufacturing micro-porous material according to claim 6, which comprises the additional step of forming the solid dry mass whilst the material is under pressure and at a temperature of from 90° to 95° C.

8. Method of manufacturing micro-porous material for use in constructing separators for a storage battery, which comprises the steps of treating a shredded light-weight wood, such as balsa wood, for a period of approximately forty-eight hours with a four per cent solution of caustic soda to soften and loosen the fibres thereof and to remove substances that would be deleterious to the plates of a storage battery, incorporating silica gel in the material thus treated in the ratio of 600 cc. of gel to three gallons of treated material, converting the treated material into a fine pulp, mixing the aqueous suspension thus obtained with a dispersing agent in the proportion of 150 parts by volume of the suspension with 3 parts of the dispersing agent and with 3 parts of a water-soluble phenol-formaldehyde resin, forming a solid dry mass from the wet mixture produced, and polymerising the phenol-formaldehyde resin to form an acid-resisting polymer in the dry mass.

FRANK BOOTH.

References Cited in the file of this patent

UNITED STATES PATENTS

| Number | Name | Date |
|---|---|---|
| 1,458,377 | Anderson | June 12, 1923 |
| 1,499,863 | Frahm | July 1, 1924 |
| 1,500,220 | Benner | July 8, 1924 |
| 1,744,256 | Benner et al. | Jan. 21, 1930 |
| 2,197,724 | Hovey | Apr. 16, 1940 |
| 2,230,903 | Ostenberg | Feb. 4, 1941 |
| 2,272,742 | Fiedler | Feb. 10, 1942 |
| 2,335,757 | Hall | Nov. 30, 1943 |
| 2,338,602 | Schur | Jan. 4, 1944 |
| 2,340,728 | Baker et al. | Feb. 1, 1944 |
| 2,360,645 | Bruce et al. | Oct. 17, 1944 |
| 2,365,753 | Gleason | Dec. 26, 1944 |
| 2,375,008 | Laurence | May 1, 1945 |
| 2,385,438 | Fowler et al. | Sept. 25, 1945 |
| 2,433,168 | Staeger | Dec. 23, 1947 |
| 2,591,755 | Wilson et al. | Apr. 8, 1952 |

OTHER REFERENCES

Chemical Abstracts, vol. 37, page 3939, 1943.
Chemical Abstracts, vol. 39, page 416, 1945.